Aug. 7, 1951  E. A. KILLIN  2,563,046
COMBINED CLOTHES AND DISH WASHER
Filed May 31, 1944  5 Sheets-Sheet 1

Inventor

ERNEST ALLEN KILLIN,

By  Clarence A. O'Brien
and Harvey B. Jacobson
Attorneys

Aug. 7, 1951 E. A. KILLIN 2,563,046
COMBINED CLOTHES AND DISH WASHER
Filed May 31, 1944 5 Sheets-Sheet 2
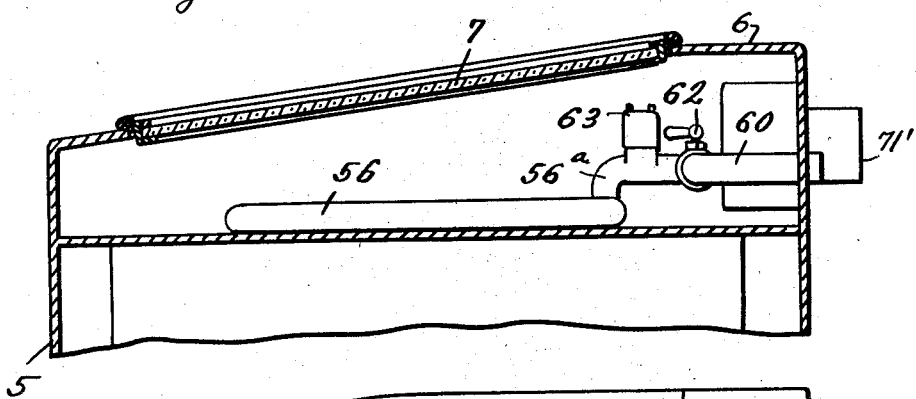
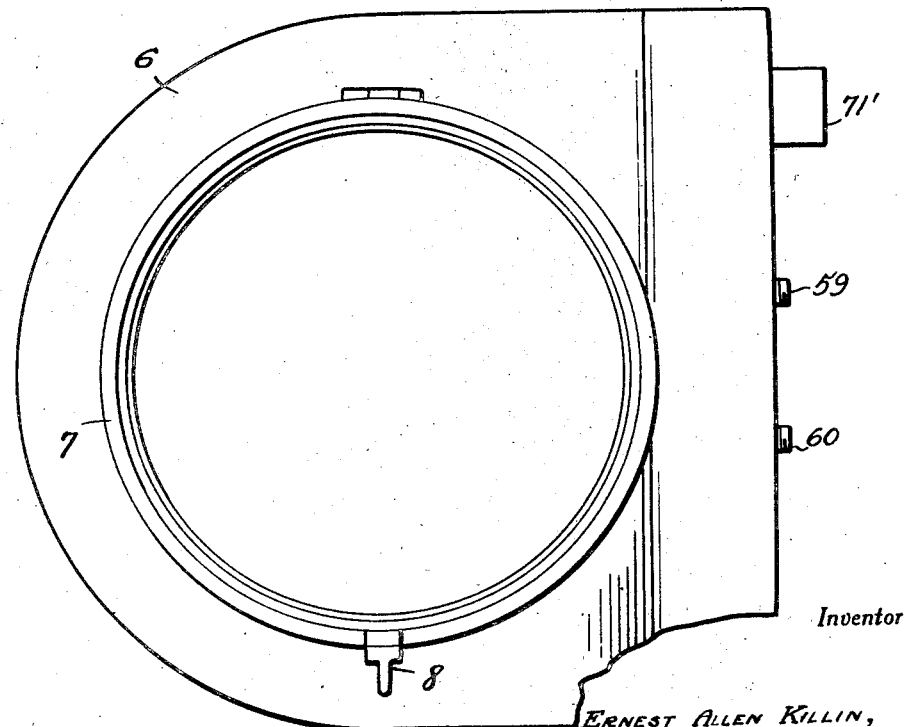

Aug. 7, 1951 — E. A. KILLIN — 2,563,046
COMBINED CLOTHES AND DISH WASHER
Filed May 31, 1944 — 5 Sheets-Sheet 3

Inventor
ERNEST ALLEN KILLIN,

By Clarence A. O'Brien
and Harvey B. Jacobson
Attorneys

Aug. 7, 1951  E. A. KILLIN  2,563,046
COMBINED CLOTHES AND DISH WASHER
Filed May 31, 1944  5 Sheets-Sheet 4
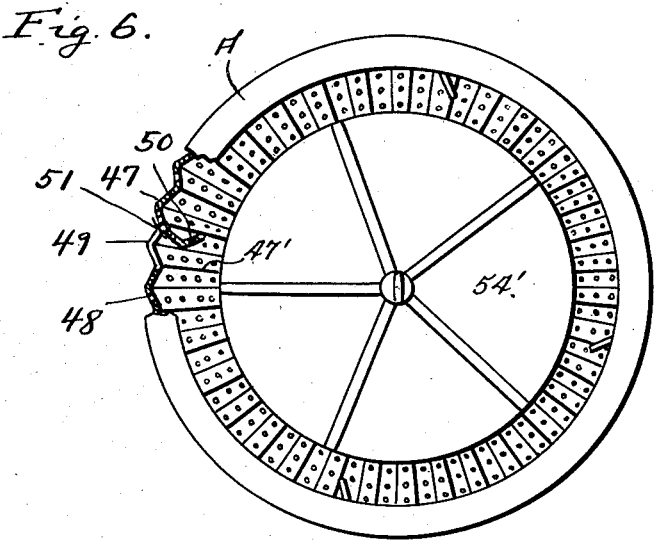
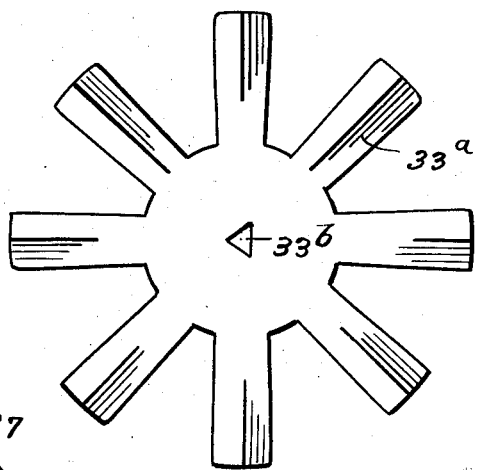
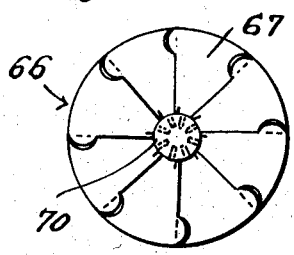
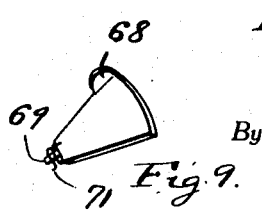
Inventor
ERNEST ALLEN KILLIN,
By
Attorneys Aug. 7, 1951 E. A. KILLIN 2,563,046
COMBINED CLOTHES AND DISH WASHER
Filed May 31, 1944 5 Sheets-Sheet 5
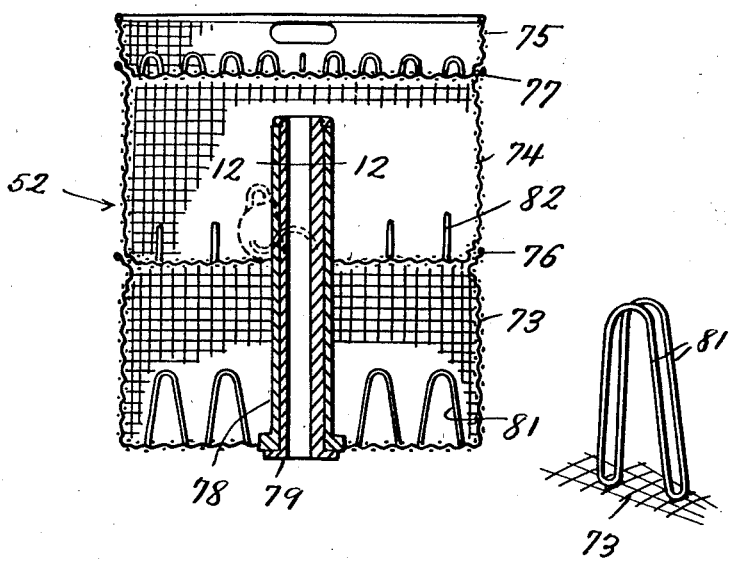
Fig. 10.
Fig. 13.
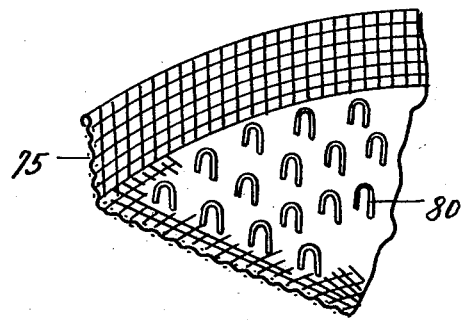
Fig. 11.
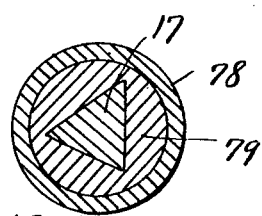
Fig. 12.
Inventor
ERNEST ALLEN KILLIN,
By Clarence A. O'Brien
and Harvey B. Jacobson
Attorneys Patented Aug. 7, 1951

2,563,046

UNITED STATES PATENT OFFICE 2,563,046

COMBINED CLOTHES AND DISH WASHER

Ernest Allen Killin, Battle Creek, Mich.

Application May 31, 1944, Serial No. 538,125

6 Claims. (Cl. 68—23)

This invention appertains to new and useful improvements in washing machines and more particularly to a convertible washer in which either clothes or dishes may be washed in a safe, practical and efficient manner.

An important object of the present invention is to provide a machine in which clothes can be washed quickly and efficiently and then subsequently dried without removal.

Another important object of the invention is to provide a convertible machine which can be used if desired first as a clothes washer and then secondly with but a minimum of change in parts as a dish washer.

Other objects and advantages of the invention will become apparent to the reader of the following specification.

In the drawings:

Figure 2 is a vertical sectional view taken substantially on line 2—2 of Figure 1.

Figure 3 is a top plan view of the machine.

Figure 6 is a top plan view partly in section of the drum and agitator.

Figure 7 is a plan view of an air circulating fan such as is carried by the bottom of the drum.

Figure 8 is an elevational view of the automatically operative exhaust louver.

Figure 9 is a perspective view of one of the blades of said louver.

Figure 10 is a vertical sectional view through the dish-containing basket.

Figure 11 is a perspective fragmentary view of the upper tray portion of the basket.

Figure 12 is a cross-sectional view taken substantially on line 12—12 of Figure 10 showing the shaft therein.

Figure 13 is a fragmentary perspective view showing one of the dish holders.

Figure 1:
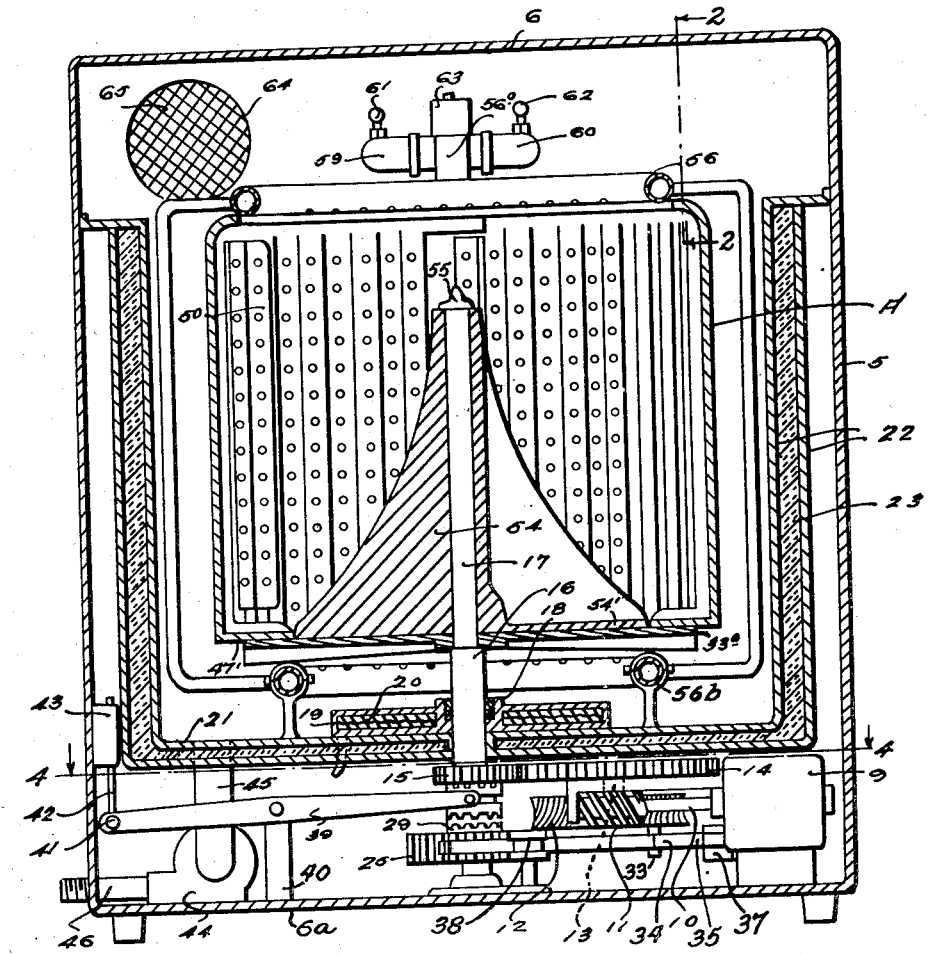
Figure 1 represents a vertical sectional view of the machine as a clothes washer.

Referring to the drawings (Fig. 1) wherein like numerals designate like parts, it can be seen that numeral 5 represents the shell or casing of the machine, this having a top 6 and a bottom 6a. The top 6 has a windowed hinged closure 7 therefor and this is equipped with a suitable detent 8.

Suitably mounted on the bottom of the shell 5 is an electric motor 9 having an armature shaft 10 equipped with a worm 11 which is in driving mesh with a worm gear 12 on a shaft 13. Also on this shaft 13 (see Fig. 4) is a gear 14 which meshes with a freely rotatable pinion 15 on the journal portion 16 of a polygonal-shaped shaft 17, this portion 16 extending through a packing gland 18 which is centrally located in respect to a shell 19 which contains an electric heating element 20, this heating assembly being located on the bottom 21 of a spaced wall tank 22 backed with suitable heat insulation material 23.

Figure 5:
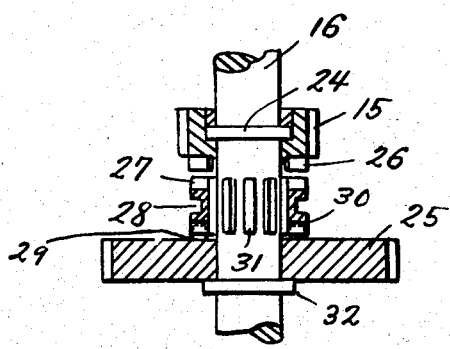
Figure 5 is a fragmentary vertical sectional view through the clutch means.

As is shown in Figure 5, the pinion gear 15 is freely rotatable on the shaft 16 and is held on the shaft by a collar 24 to prevent longitudinal movement of the pinion on the shaft. The side of the pinion 15 opposed to a lower gear 25 on shaft portion 17 has clutch teeth 26 thereon with which clutch teeth 27 on a clutch collar 28 are engageable. The gear 25 is likewise provided with clutch teeth 29 with which the lower clutch teeth 30 on the clutch collar 28 are meshable and as is clearly shown in Figure 5, the clutch collar 28 is splined, as at 31, to the shaft portion 16. The gear 25 is also freely rotatable on the shaft portion 16 as is pinion 15 and is supported by a collar 32.

Figure 4:
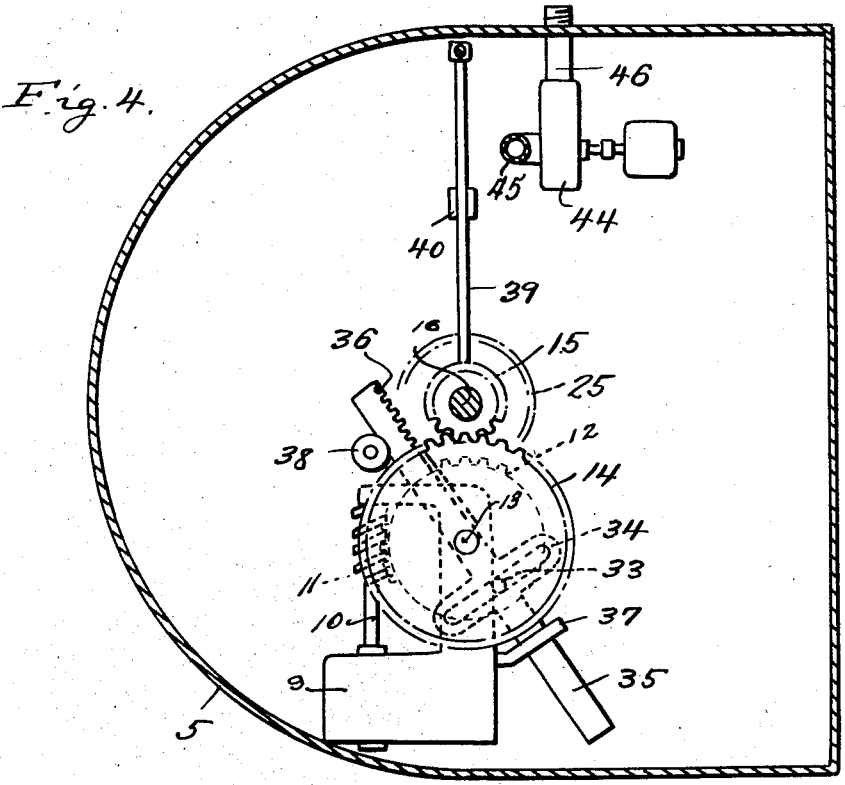
Figure 4 is a horizontal sectional view on line 4—4 of Figure 1.

As is shown in dotted lines in Figure 4, the worm gear 12 has an eccentric pin 33 (see Fig. 1) on its bottom side which is disposed into the longitudinal slot of a cross frame 34, the cross frame being part of an elongated bar 35. As the gear 12 rotates the bar 35 is reciprocated and a slotted lug 37 and a roller 38 serve as guides therefor. One end of the bar 35 is provided with rack teeth 36 which mesh with the gear 25.

For operating the clutch collar 28, an arm 39 is provided, rockably supported on a post 40. One end of this arm 39 is formed with a yoke for embracing the collar 28 while the opposite end is pivotally connected as at 41 to a rod 42 connected to the armature of a solenoid 43. Thus by suitable switch means (not shown) the arm can be controlled electrically from the outside of the machine.

Numeral 44 represents a motor-operated pump having a pipe connection 45 to the inside of the double wall tank structure 22 and this has an outlet 46. With this structure water can be pumped from said tank 22.

Reference character A denotes a clothes drum which is of fluted wall construction with the flutes 47 having perforations 48 therein. At four or five points around the circumference of the drum A vertically extending openings are formed and these are denoted by numeral 49 each having a perforated hinged blade 50 connected to the adjacent edge portion of the drum at its respective openings 49 by a spring hinge 51, which serves to normally throw the blades or baffles 50 inwardly so as to serve as splashers for the water to splash water onto the dishes contained in the basket assembly generally referred to by numeral 52. However, when clothes are being washed in the drum A, the latter will be alternately rotated in opposite directions so that the spring-biased blades will yieldingly contact the clothes in the drum, thereby kneading the clothes and improving the washing operation.

A conical-shaped agitator or article support member 54 is removably disposed on the shaft 17, this agitator 54 being formed to provide a plurality of radially disposed blades and has a polygonal-shaped hub bore therethrough for receiving the polygonal-shaped shaft 17. A cap screw 55 at the upper end of the shaft 17 prevents displacement of the agitator, and permits its removal when it is desired to substitute the dish-washing baskets (see Fig. 10).

An annular perforated pipe 56 overlies the drum A and has a connection 56a to hot and cold water supply pipes 59 and 60 having cut off and regulating valves 61 and 62 respectively. In the connection 56a is a valve (not shown) controlled by a magnetic unit 63. Obviously by looking through the window of the closure 7 the attendant can ascertain when to shut off the water and this can be done by the magnetic valve 63 without opening said closure 7.

A second annular perforated pipe 56b underlies the drum A for the purpose of delivering water upwardly into the drum when the agitator 54 has been removed to permit washing of dishes.

In the upper portion of the shell 5 is an opening 64 closed by a mesh sheet 65 and with this as shown, in Figure 8, a fan-like exhaust louver generally referred to by numeral 66 is employed. This consists of a plurality of blades 67 each being of segmental construction and having a small inwardly disposed ear 68. These blades are connected swivelly by pintles 69 to the hub 70 and spring means 71 serve to normally maintain the blades all in the same plane. A shaft (not shown) is secured to the hub and rotatably journaled on suitable brackets (not shown) in the casing 71', which casing is disposed axially of the opening 64. However, as vapor and steam pressure in the drum A builds up and begins to exert pressure against the blades, the blades swing on their swivels and obviously begin to rotate the louver. Thus the louver serves as a means for exhausting steam and vapors from the inside of the shell.

When it is desired to use the machine for washing dishes, the agitator 54 is removed and the basket assembly or article support member 52 applied. The basket assembly consists of the lower basket 73, the intermediate basket 74 and the top basket or tray 75. The upper portions of the baskets 73 and 74 flare outwardly as at 76 and 77 respectively to form seats for the basket 74 and tray 75 respectively. From the bottom of the basket 73, a sleeve 78 extends upwardly and through the bottom of the basket 74. Through the sleeve 78 extends the tube 79 which has a polygonal-shaped opening therethrough for receiving the shaft 17.

On the bottom of the tray 75 are the inverted U-shaped member 80 forming loops through which knives, spoons and the like can be disposed for holding the same steady, while on the bottoms of the baskets 73 and 74 are wire uprights 81 in which dishes can be placed. On the bottom of the basket 74 spring-like hook members 82 may be provided for holding cups in place.

As before stated, the agitator 54 is removable from the polygonal-shaped portion of the shaft 16 so that the basket assembly 52 (see Figure 10) can be applied when it is desired that dishes be washed. As shown in Figure 1, the lower portion of the drum A has an inturned flange or ledge 47' and to the bottom side of this is welded the tips of the blades 33a of a spider-like structure such as is shown in Figure 7. The base of the agitator 54 is in the form of a plate 54' which rests upon the spider and at its periphery meets the edge of the ledge 47', the diameter of the plate 54' being less than the inner diameter of the upper pipe 56, as clearly shown in Figure 1.

When it is desired that clothes be washed, the clothes are dropped into the drum A and the tub then being filled by means of the pipes 56 and 56b to the desired level. Of course, the agitator 54 is in place and the drum A can either be rotated or oscillated. The drum is rotated if the upper teeth 27 of the clutch collar 28 are engaging the teeth 26 of the gear 15. However, if oscillation of the drum A is desired, the clutch collar 28 is shifted downwardly to engage the teeth 29 on the gear 25 and the oscillating means 33, 34, 35 will be brought into play for oscillating the drum A.

When dishes are to be washed, the agitator 54 is removed, and in its place is disposed the foraminous basket assembly 52, which rests upon the spider structure shown in Figure 7. The drum, in washing dishes, is preferably slowly oscillated. The desired temperature of water is arrived at by the control valves 61, 62 and water is supplied from this point to the annular perforated pipes 56, 56b, the water spraying downwardly onto the dishes and upwardly. The presence of the blades 50 permit a certain amount of deflection of the water for more thorough washing of the dishes or other articles disposed in the basket assembly 52. After the dishes have been properly washed, they are removed and dried.

While the foregoing specification sets forth the invention in specific terms, it is to be understood that numerous changes in the shape, size and materials can be resorted to without departing from the spirit and scope of the invention as claimed hereinafter.

Having described the invention what is claimed as new is:

1. A washing machine comprising a tank, a vertical spindle extending into said tank, a drum having perforated side walls, means securing said drum to said spindle, an article support member disposed in said drum and detachably mounted on said spindle, said member having a base thereon overlying said drum securing means, means for selectively oscillating and rotating said spindle, said drum having vertically extending slots in the side walls thereof, blades horizontally pivotally attached to said side walls adjacent said slots, spring means yieldingly urging said blades inwardly of said drum, and an annular spray ring mounted adjacent the upper end of said drum.

2. A washing machine comprising a tank, a vertical spindle extending into said tank, a drum having perforated side walls, means securing said drum to said spindle, an article support member disposed in said drum and detachably mounted on said spindle, said member having a base thereon overlying said drum securing means, means for selectively oscillating and rotating said spindle, said drum having vertically extending slots in the side walls thereof, blades horizontally pivotally attached to said side walls adjacent said slots, spring means yieldingly urging said blades inwardly of said drum, said drum securing means including a hub, radially extending arms attached to said hub, the free ends of said arms being attached to said drum.

3. A washing machine comprising a tank, a vertical spindle extending into said tank, a drum having perforated side walls, means securing said drum to said spindle, an article support member disposed in said drum and detachably mounted on said spindle, said member having a base thereon overlying said drum securing means, means for selectively oscillating and rotating said spindle, said drum having vertically extending slots in the side walls thereof, blades horizontally pivotally attached to said side walls adjacent said slots, spring means yieldingly urging said blades inwardly of said drum, said securing means including a hub, radially extending arms of substantially V-shape in cross-section attached to said hub, the outer ends of said arms being attached to said drum.

4. A washing machine comprising a tank, a vertical spindle extending into said tank, means for selectively rotating and oscillating said spindle, a drum having perforated side walls and an inwardly extending rim adjacent the lower edge of said side walls, means non-rotatably attaching said drum to said spindle, an article support member mounted on said spindle and having an annular base, said base overlying and covering the opening defined by the inner periphery of said rim, said drum having vertically extending slots therein, blades horizontally pivotally attached to said drum adjacent said slots, and spring means yieldingly urging said blades inwardly of said drum.

5. A washing machine comprising a tank, a vertical spindle extending into said tank, means for selectively rotating and oscillating said spindle, an article support member mounted on said spindle, a drum having perforated side walls, an inwardly extending rim on the lower end of said side walls, a spider non-rotatably secured to said spindle, the outer end of said spider being secured to the under surface of said rim, an agitator having an annular base plate mounted on said spindle, said base plate being disposed within the inner periphery of said rim, said drum having vertically extending slots therein, blades horizontally pivotally attached to said drum adjacent said slots, and spring means yieldingly urging said blades inwardly of said drum.

6. A washing machine comprising a tank, a vertical spindle extending into said tank, means for selectively rotating and oscillating said spindle, a drum having perforated side walls, means securing said drum to said spindle for rotation therewith, said drum having circumferentially spaced vertically extending slots, and blades horizontally pivotally attached to said drum adjacent said slots, and means yieldingly urging said blades inwardly of said drum.

ERNEST ALLEN KILLIN.

REFERENCES CITED

The following references are of record in the file of this patent:

UNITED STATES PATENTS

| Number | Name | Date |
| --- | --- | --- |
| 99,029 | Stranahan | Jan. 18, 1870 |
| 1,066,705 | Budd | July 8, 1913 |
| 1,310,537 | Merkel | July 22, 1919 |
| 1,405,243 | Wing | Jan. 31, 1922 |
| 1,665,959 | Graham | Apr. 10, 1928 |
| 1,806,982 | McKercher | May 26, 1931 |
| 1,847,665 | Perkins | Mar. 1, 1932 |
| 2,023,013 | Faber | Dec. 3, 1935 |
| 2,146,433 | Jackson | Feb. 7, 1939 |
| 2,151,354 | Osuch | Mar. 21, 1939 |
| 2,173,564 | Osuch | Sept. 19, 1939 |
| 2,208,397 | Shawber | July 16, 1940 |
| 2,246,104 | Osuch | June 17, 1941 |
| 2,272,541 | Blake | Feb. 10, 1942 |
| 2,313,984 | Breckenridge | Mar. 16, 1943 |
| 2,346,152 | Clark | Apr. 11, 1944 |

FOREIGN PATENTS

| Number | Country | Date |
| --- | --- | --- |
| 437,252 | Great Britain | Oct. 28, 1935 |